July 27, 1965  A. I. MINTZER ETAL  3,197,771
SIGNAL DETECTION, THRESHOLDING AND SWITCHING SYSTEM
Filed Nov. 19, 1964
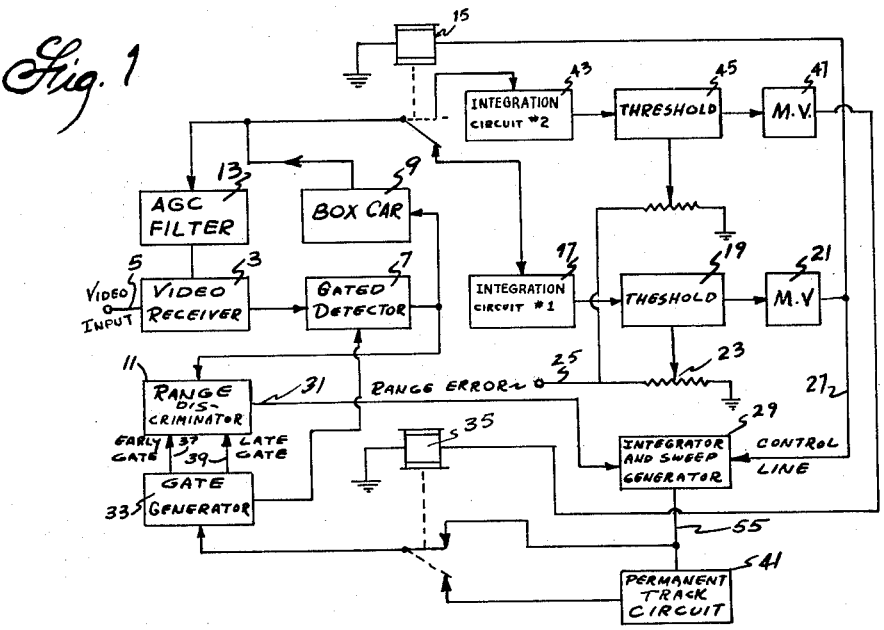
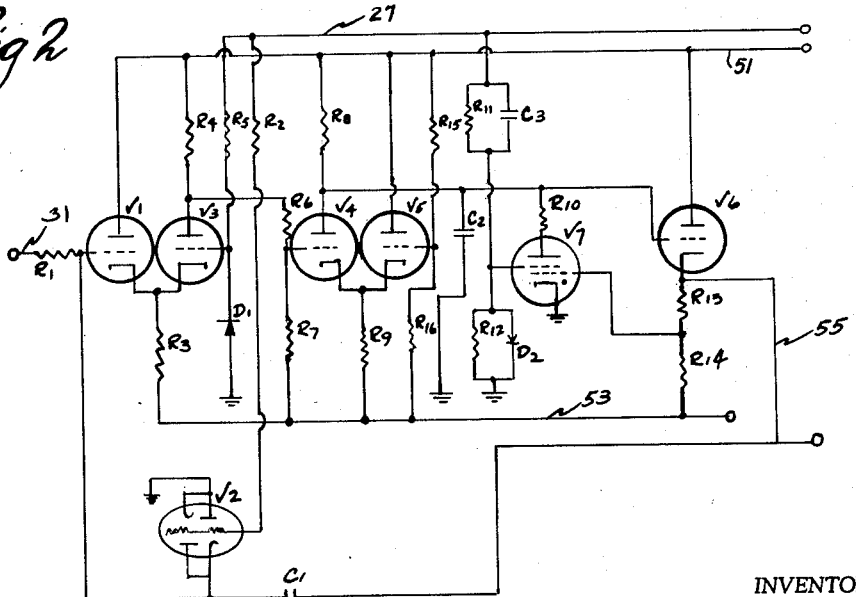
INVENTOR.
ALFRED I. MINTZER
ANTON N. LISICKY
BY
ATTORNEY

United States Patent Office 3,197,771
Patented July 27, 1965

3,197,771
SIGNAL DETECTION, THRESHOLDING AND SWITCHING SYSTEM
Alfred I. Mintzer, Lexington, Mass., and Anton J. Lisicky, Cherry Hill, N.J., assignors, by mesne assignments, to the United States of America as represented by the Secretary of the Navy
Filed Nov. 19, 1964, Ser. No. 412,575
4 Claims. (Cl. 343—7.3)

This is a continuation-in-part of application Serial Number 70,085, filed November 17, 1960, now abandoned.

The present invention relates to novel and improved radar circuitry and more particularly to novel and improved circuits for the automatic detection and ultimate tracking of a target in a preselected sector of search.

In automatic radar target detection devices that operate on video type incoming signals, the problem of distinguishing the signal pulse from noise pulses oftentimes becomes somewhat troublesome. For improved resolution of this problem, a portion of the video return is commonly time gated and subsequently integrated prior to application to the thresholding circuit which controls energization of the tracking circuitry. Where a large search interval is involved, however, a multiplicity of such gates must be used and location of a signal in the interval then becomes relatively complex. To eliminate the use of a plurality of gates, use of the scanning gate which locks on a signal if the threshold is actuated is commonly employed.

In the scan type gating circuit where the time for search is limited, the scanning speed must be increased. Thus, for a given pulse repetition frequency, the number of pulse returns that can be integrated in the threshold circuit must be limited. In relatively high speed gate scanning apparatus, therefore, the signal to noise ratio is decreased with a resultant decrease in sensitivity for an effective discrimination operation.

It is therefore a principal object of the present invention to provide a novel and improved radar tracking alarm circuit which is operative at a high scan rate without deterioration of signal to noise sensitivity.

It is a further object of the present invention to provide novel and improved radar alarm circuitry wherein energization of a first threshold circuit having reduced sensitivity actuates a second threshold circuit having improved sensitivity in preparation for generation of a final lock-on tracking signal.

Other objects and many of the attendant advantages of this invention will be readily appreciated as the same becomes better understood by reference to the following detailed description when considered in connection with the accompanying drawing wherein:

FIG. 1 is a diagrammatic view of a preferred embodiment of the present invention; and FIG. 2 is a detailed schematic view of a preferred embodiment of the integrator-generator circuit shown in FIG. 1.

A preferred embodiment of the present invention is illustrated in FIG. 1 of the drawing. As shown therein, the echo and noise signals are fed into the receiver 3 over conductor 5. The output circuit of receiver 3 is connected to the gated detector 7 which drives the input circuits of the boxcar or peak detector circuit 9 and the range discriminator 11. The output of the boxcar circuit 9 is coupled to the video receiver 3 through the AGC filter 13 and to the armature of relay 15. Relay 15 is energized by a circuit that extends from the boxcar circuit through its lower contact through the short time constant integration circuit 17, through the threshold circuit 19 and through the one shot multivibrator circuit 21.

Threshold circuit 19 preferably consists of a nonthermionic diode with an adjustable back bias which is controlled by the potentiometer 23 which is energized by the D.C. power supply line 25. The output circuit of multivibrator 21 is also coupled through conductor 27 to the integrator and sweep generator circuit 29 which is also energized by a range error signal on conductor 31 from the range discriminator 11. The output circuit of the integrator and sweep generator 29 is coupled to the gate generator 33 through the upper contact of relay 35. The gate generator 33 supplies the detector 7 with a range gate signal and the discriminator 11 with conventional early and late gate signals on conductors 37 and 39. When relay 35 is de-energized, the permanent track circuit 41 is coupled to the input circuit of gate generator 33 through lower contact of relay 35. Relay 35 is energized by a circuit that extends from the boxcar circuit 9 through the upper contact of relay 15 through the long time constant integration circuit 43, through the threshold circuit 45 and through the multivibrator circuit 47. Threshold circuit 45 preferably also consists of a non-thermionic diode having an adjustable back bias which is controlled by the potentiometer 49 that is energized by the D.C. power supply line 25.

The structural details of the integrator and sweep generator circuit 29 are illustrated in FIG. 2 of the drawing. As shown therein, the range error signal from the range discriminator circuit 11 on conductor 31 is coupled to the control grid of triode $V_1$ through resistor $R_1$. The grid of triode $V_1$ is also coupled to ground through double triode $V_2$, the grid of $V_2$ being connected to the control line 27 through resistor $R_2$. The plate circuit of triode $V_1$ extends from the positive voltage supply line 51 through the tube and through the resistor $R_3$, which provides a common bias for triodes $V_1$ and $V_3$, to the negative voltage supply line 53. The plate circuit of triode $V_3$ extends from supply line 51 through resistor $R_4$, through the tube and through cathode resistor $R_3$ to the negative voltage supply line 53. The control signal from the multivibrator 21 on conductor 27 is coupled to the control grid of triode $V_3$ through resistor $R_5$ and diode $D_1$. The plate of triode $V_3$ is coupled to the grid of triode $V_4$ through resistor $R_6$ and resistor $R_7$. The plate circuit of triode $V_4$ extends from the positive voltage supply line 51 through resistor $R_8$ through the tube and through resistor $R_9$ to the negative voltage supply line 53. Resistor $R_9$, as will be more apparent hereinafter, provides a common cathode bias for triodes $V_4$ and $V_5$. The plate circuit of triode $V_5$ extends from the positive voltage supply line 51 through the tube and through resistor $R_9$ to the negative supply line 53. The control grid of triode $V_5$ is connected to the junction of series connected resistors $R_{15}$ and $R_{16}$ which interconnect the positive and negative supply lines 51 and 53. The plate of triode $V_4$ is tied to the grid of triode $V_6$ and is also coupled to ground through condenser $C_2$. The grid of triode $V_6$ is also coupled to ground through resistor $R_{10}$ and thyratron $V_7$. The screen grid of thyratron $V_7$ is connected to the junction of the parallel arrangement of resistor $R_{11}$ and condenser $C_3$ and the parallel arrangement of resistor $R_{12}$ and rectifier element $D_2$ which couple control line 27 to ground. The plate circuit of triode $V_6$ extends from the positive supply line 51 through the tube and through resistors $R_{13}$ and $R_{14}$ to the negative supply line 53. The control grid of thyratron $V_7$ is connected to the junction of resistors $R_{13}$ and $R_{14}$ and the cathode of triode $V_6$ is coupled to the grid of triode $V_1$ through condenser $C_1$.

Considering now a more detailed description of the operation of the circuit of the present invention, during a normal search operation, the armature of relay 15 is initially de-energized and the output of the boxcar circuit 9 is coupled to the one shot multivibrator 21 through integration circuit 17 and the threshold circuit 19. When a given sector of interest is to be searched, the transmitted echo and random noise signals are fed into the receiver 3 of the radar circuit. The amplified output signals from the receiver are received in the detector 7 only during the presence of the range gate which is supplied to the detector in a manner which will be more apparent hereinafter. The gated video output of the detector is then fed to the boxcar or holding peak detector circuit 9 and to the discriminator circuit 11 where the range error voltage is developed. The box-carred gated video is then used to generate a suitable AGC voltage in the filter circuit 13 for receiver 3 and to supply a suitable signal to the threshold circuits 19 and 45. When occurrence of the range gate and an incoming video or noise signal coincide, the output signal of the boxcar circuit 9 is fed through the de-energized armature of relay 15 and through the integration circuit 17 to the threshold circuit 19. The back bias potential applied to the non-thermionic diode of the threshold circuit 19 is set by adjustment of potentiometer 23 such that integration of the number of suitable pulses received by the video receiver during the gate interval permits energization of multivibrator 21. When multivibrator 21 is pulsed, a negative potential is provided on conductor 27 which energizes relay 15 and also causes the integrator-generator circuit 29 to function as an integrator and stop the scan in a manner which will be more apparent hereinafter. Relay 15 remains energized for a controlled extended time interval which is dependent upon the nature and size of the parameters of the one shot multivibrator 21. During this extended interval, the video and noise signals from receiver 3 and the boxcar circuit 9 are fed through the upper contact of relay 15 through integration circuit 43 and threshold circuit 45 to multivibrator 47. When the integrated output potential of boxcar circuit 9 overcomes the preset back bias of the non-thermionic diode of threshold circuit 45, multivibrator 47 is switched, relay 35 is de-energized and the conventional permanent tracking circuit 41 is connected to the gate generator 33 for generation of the range gate voltage for detector 7 and the early and late gate pulses for the range discriminator 11.

For a detailed description of the mode of operation of the integrator-generator 29, attention is directed to FIG. 2 of the drawing. This circuit generates a sweep voltage which moves the range gate during a searching operation and behaves as an integrator for indication of the last known position of the target during a tracking operation. During search, multivibrator 21 is in its normal stable mode of energization and provides a positive output potential on conductor 27. This positive potential causes triode $V_3$ to conduct heavily and due to the bias potential developed in cathode resistor $R_3$ cuts off triode $V_1$. Simultaneously, the grid of triode $V_1$ and condenser $C_1$ assume substantially ground potential due to the low impedance to ground through triode $V_2$. The decrease in potential at the plate of triode $V_3$ is then fed to the grid of normally conducting triode $V_4$ which immediately is cut off. This abruptly raises the potential of the plate of triode $V_4$ and condenser $C_2$ begins to charge through plate resistor $R_8$. The increase in potential across condenser $C_2$ is fed to the grid of the cathode follower circuit of triode $V_6$ and the potential at the cathode of triode $V_6$ rises substantially linearly. When the cathode potential of triode $V_6$ and the potential at the control grid of thyratron $V_7$ exceeds a fixed value, thyratron $V_7$ fires, condenser $C_2$ is discharged and the charging cycle begins again. The sawtooth voltage which is produced at the cathode of triode $V_6$ is then fed through conductor 55 and through the upper contact of relay 35 to the gate generator 33 and detector 7 to provide the sweeping gate potential that is desired during the search operation.

When a target echo signal or a deceptive noise signal is picked up in receiver 3 and multivibrator 21 is energized in the manner indicated hereinabove, a negative potential is provided on conductor 27 which drives the screen grid of thyratron $V_7$ negative and prevents its energization, cuts off triode $V_2$ and isolates the grid of triode $V_1$ from ground, and the control grid of triode $V_3$ is clamped at ground by means of diode $D_1$. When this occurs and the range error signal on conductor 31 is fed to the grid of triode $V_1$, the variable bias produced across cathode resistor $R_3$ provides an amplified pulsation at the plate of triode $V_3$. This signal is amplified in triode $V_4$, integrated by condenser $C_2$, isolated by cathode follower $V_6$ and conducted either directly or through the permanent tracking circuit 41 to the early and late gate generator depending upon the condition of relay 35. Thus, it is seen that the above described circuit provides a positive acting tracking lock-on circuit which permits high speed scanning without simultaneous deterioration of sensitivity.

Obviously, many modifications and variations of the present invention are possible in the light of the above teachings. It is therefore to be understood that within the scope of the appended claims, the invention may be practiced otherwise than as specifically described.

What is claimed is:
1. Radar target detection apparatus comprising:
 (a) a video receiver;
 (b) means for scan gating the receiver over a preselected radar search area;
 (c) a first integrating circuit normally coupled to the gated output of the receiver, said first integrating circuit having a predetermined time constant;
 (d) a first threshold circuit coupled to the output of the first integrating circuit;
 (e) a second integrating circuit having a time constant which is a predetermined amount greater than the time constant of the first integrating circuit;
 (f) a second threshold circuit coupled to the output of the second integrating circuit;
 (g) means responsive to energization of the first threshold circuit for coupling the gated output of the receiver to the second integrating circuit;
 (h) tracking circuitry;
 (i) and means responsive to energization of the second threshold circuit for deenergizing the receiver scan gating means and energizing the tracking circuitry.

2. Radar target detection apparatus comprising:
 (a) a video receiver;
 (b) means for scan gating the receiver over a preselected radar search area;
 (c) a first integrating circuit having a predetermined time constant;
 (d) a first threshold circuit coupled to the output of the first integrating circuit;
 (e) a second integrating circuit having a time constant which is a predetermined amount greater than the time constant of the first integrating circuit;
 (f) a second threshold circuit coupled to the output of the second integrating circuit;
 (g) a relay having an armature which normally occupies a first position and which energized assumes a second position;
 (h) means normally coupling the gated output of the receiver to the first threshold circuit through the relay armature in its first position and through the first integrating circuit;
 (i) means responsive to energization of the first threshold circuit for energizing the relay and coupling the gated output of the receiver to the second threshold circuit through the relay armature in its second position and through the second integrating circuit;
 (j) tracking circuitry;
 (k) and means responsive to energization of the second threshold circuit for deenergizing the receiver scan gating means and energizing the tracking circuitry.

3. Radar target detection apparatus comprising:
(a) a video receiver;
(b) means for scan gating the receiver over a preselected radar search area;
(c) a first integrating circuit having a predetermined time constant;
(d) a first threshold circuit coupled to the output of first integrating circuit;
(e) a one shot multivibrator coupled to the output of the first threshold circuit;
(f) a second integrating circuit having a time constant which is a predetermined amount greater than the time constant of the first integrating circuit;
(g) a second threshold circuit coupled to the output of the second integrating circuit;
(h) relay means having an armature which normally occupies a first position and which when energized assumes a second position, said relay being effective when the multivibrator is energized to couple the gated output of the receiver to the second threshold circuit through the relay armature in its second position and through the second integrating circuit;
(i) means normally coupling the gated output of the receiver to the first threshold circuit through the relay armature in its first position and through the first integrating circuit;
(j) tracking circuitry;
(k) and means responsive to energization of the second threshold circuit for deenergizing the receiver scan gating means and energizing the tracking circuitry.

4. Radar target detection apparatus comprising:
(a) a video receiver;
(b) a gated detector coupled to the output of the receiver;
(c) a first integrating circuit having a predetermined time constant;
(d) a first threshold circuit coupled to the output of the first integrating circuit;
(e) a one shot multivibrator coupled to the output of the first threshold circuit;
(f) a second integrating circuit having a time constant which is a predetermined amount greater than the time constant of the first integrating circuit;
(g) a second threshold circuit coupled to the output of the second integrating circuit;
(h) relay means having an armature which normally occupies a first position and which when energized assumes a second position, said relay being effective when the multivibrator is energized to couple the gated output of the receiver to the second threshold circuit through the relay armature in its second position and through the second integrating circuit;
(i) means normally coupling the gated output of the receiver to the first threshold circuit through the relay armature in its first position and through the first integrating circuit;
(j) means which is also coupled to the output of the multivibrator and which functions as a sweep generator for the gate detector when the relay armature occupies its first position and which acts as an integrator and a temporary tracking circuit for the gated detector when the armature occupies its second position;
(k) permanent tracking circuitry;
(l) and means responsive to energization of the second threshold circuit for deenergizing the sweep generator-integrator means and energizing the permanent tracking circuitry.

No references cited.

CHESTER L. JUSTUS, *Primary Examiner.*